Figure 1:
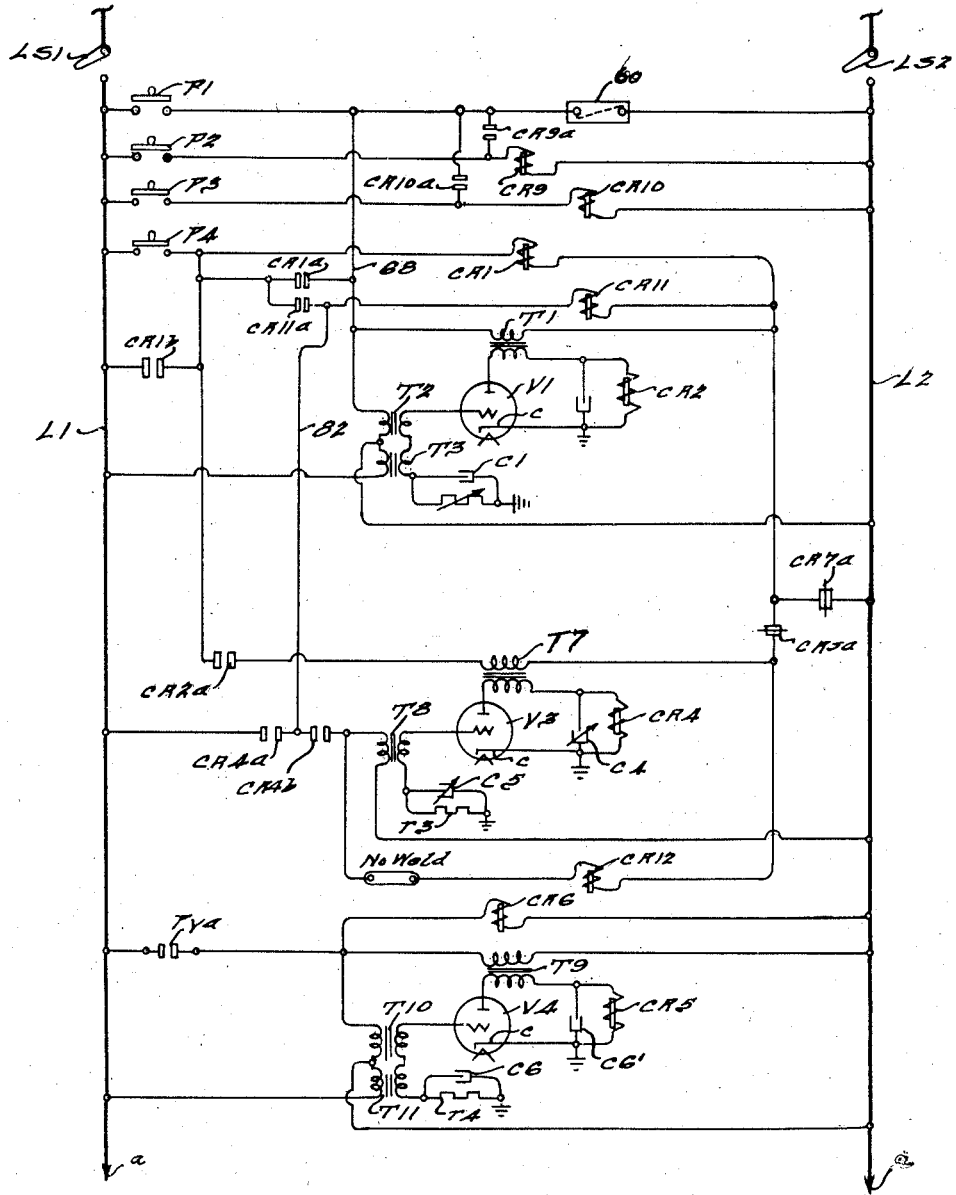

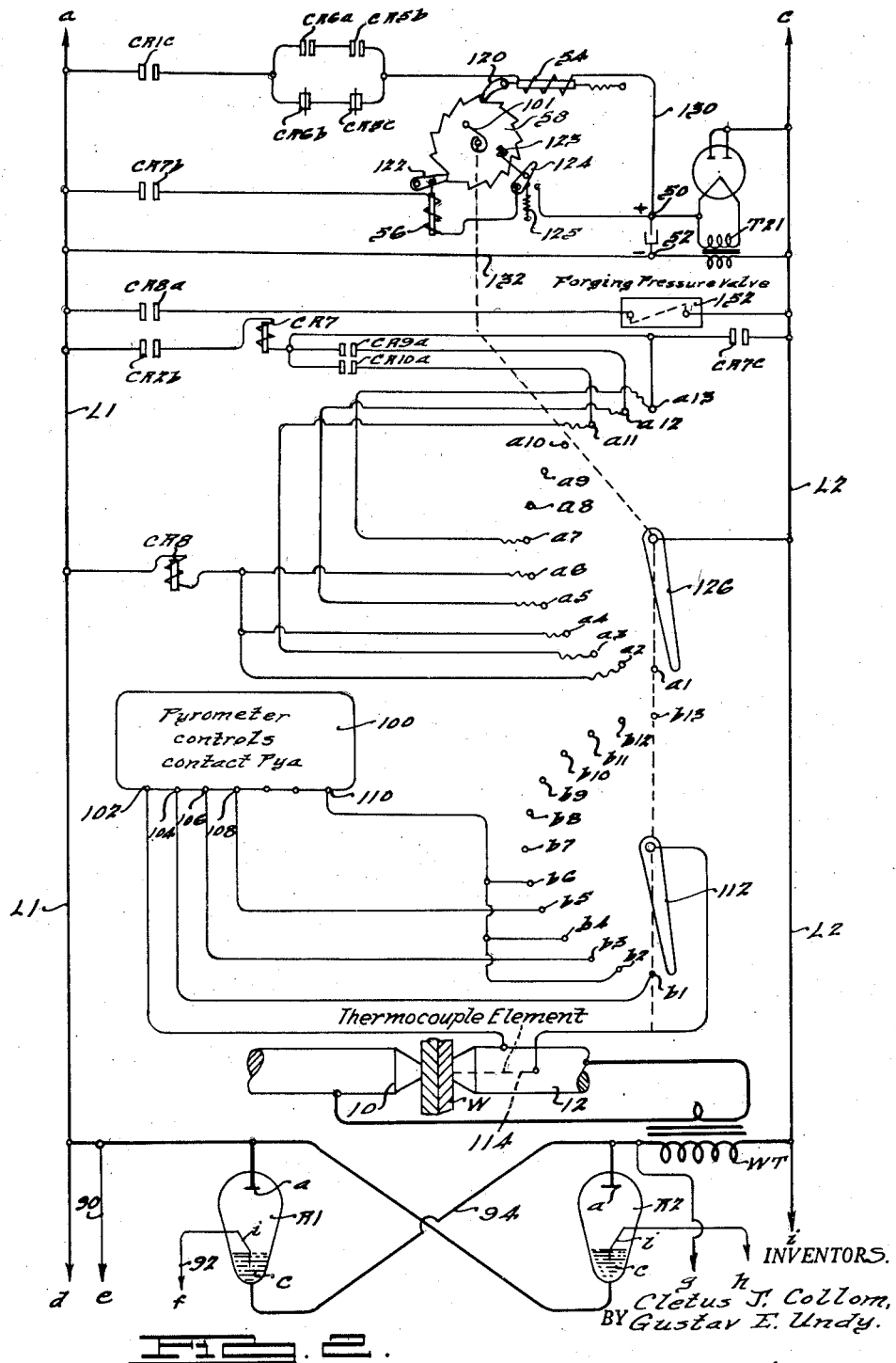

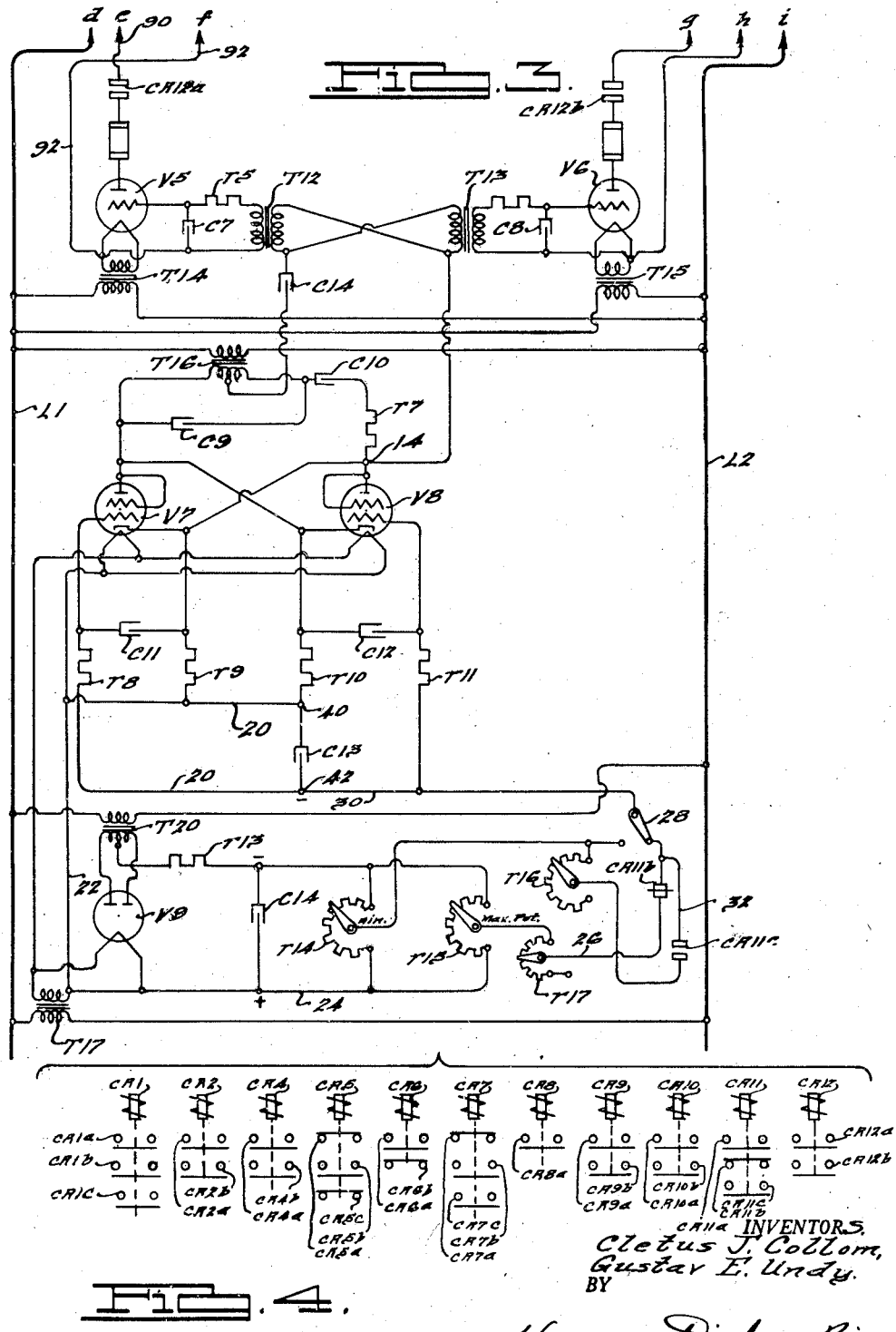

Patented Mar. 5, 1946

2,395,849

UNITED STATES PATENT OFFICE 2,395,849

ELECTRICAL CONTROL APPARATUS

Cletus J. Collom and Gustav E. Undy, Detroit, Mich.; said Undy assignor to Cletus J. Collom, Detroit, Mich., an individual, doing business as Weltronic Company Application August 7, 1943, Serial No. 497,746

9 Claims. (Cl. 250—27)

The present invention relates to electric control systems, and in particular provides improved apparatus for controlling an electric welding operation of the resistance welding type.

It has heretofore been proposed to effect the resistance welding of certain classes of metals by the use of a complete welding cycle which includes a succession of heating and cooling stages, each heating stage being terminated when the work attains a desired temperature, and each cooling stage being terminated when the temperature of the work falls to a desired value. In at least one of the stages the work is brought to a welding temperature, in at least one succeeding stage the work is brought to a temperature within the austenitic temperature range and, preferably, in at least one succeeding stage the work is brought to a temperature appropriate to an annealing action. In what is understood by the present applicants to be the preferred practice of the above system, thermoelectric apparatus is utilized to respond to the temperature of the work and to, consequently, control the terminations of the successive heating and cooling stages. Further, according to the understanding of the present applicants, it is preferred that each heating stage comprises a succession of heating and cooling periods, current flow to the work being interrupted, or at least reduced, at least once during each heating stage in the manner described, for example, in the Redmond Patent No. 2,046,969. In certain instances, also, it is preferred that at least the initial heating period of the initial stage be initiated at a relatively low value of welding current, after which the current automatically builds up to a desired maximum value, so as to afford a so-called preheating action. In cases, also, where each cooling period is accomplished by a reduction only in the value of welding current, as distinguished from an interruption of such current flow, an automatically controlled decrease in current is desired.

With the foregoing general considerations in view, the principal objects of the present invention are to provide a simple, reliable and relatively inexpensive organization of control circuits, well adapted for use in systems such as the above; to provide such a control system embodying improved and simplified arrangements for automatically adjusting the temperature controlling elements of the system to different temperature settings corresponding to the progress of the cycle; to provide such a control system incorporating improved means for providing an automatic variation in the value of current flowing in a welding circuit, said means constituting improvements upon the arrangements described and claimed in the copending Undy application Serial No. 402,922, filed July 18, 1941.

With the above as well as other objects in view, which appear in the following description and in the appended claims, a preferred but illustrative embodiment of the invention is shown in the accompanying drawings, throughout the several views of which corresponding reference characters are used to designate corresponding parts and in which:

Figures 1, 2 and 3, collectively, constitute a diagrammatic illustration of a welding system embodying the invention; and Fig. 4 is a view showing the physical relation between the operating coils and the contacts of the series of electromagnetically operated relays employed in Figs. 1, 2 and 3. In the latter figures, these coils and relays are shown in separated relation, in order to simplify the drawings.

It will be appreciated from a complete understanding of the present invention that the improvements thereof may be embodied in widely differing welding systems, particularly adapted for widely varying purposes. It is now preferred to embody these improvements in a multistage welding system of the aforesaid type, and, in an illustrative but not in a limiting sense, the invention is so disclosed herein.

Before proceeding to a description of the drawings, it is noted that the conductors which terminate, at the bottom of Figure 1, in the arrowheads designated, respectively, a and c, are directly connected to the conductors which terminate in the correspondingly designated arrowheads at the top of Figure 2. Similarly, the conductors which terminate in the arrowheads designated d, e, f, g, h and i, at the bottom of Figure 2, are directly connected to the conductors having the correspondingly designated arrowheads at the top of Figure 3.

Referring to the drawings, a usual welding transformer WT is provided with a secondary winding, the terminals whereof are directly connected to the electrodes 10 and 12 of the associated welding machine. The primary winding of the welding transformer is connected across the line conductors L1 and L2, in series with a pair of reversely connected arc discharge devices R1 and R2, which may be and preferably are of the type sold commercially under the trade name "Ignitrons." The characteristics of these devices are well known and it is thought they require no description except to note that they are normally non-conductive but that, if an igniting potential is applied between the igniters $i$ and the cathodes $c$ thereof, during a half cycle of the source in which the anodes $a$ thereof are positive, they become conductive and remain so for the balance of the corresponding half cycle of current flow.

In the illustrated system, each heating stage is made up of a succession of heating and cooling periods, the welding transformer WT being supplied with welding current during each heating period, and such current being interrupted during each cooling period. Such current is also interrupted during each of the cooling stages which intervene between successive heating stages. The points in successive half cycles of each heating period at which the corresponding rectifiers R1 and R2 are rendered conductive, to thereby energize the welding transformer WT, are determined by a pair of heat control valves V5 and V6, associated with the main rectifiers R1 and R2, respectively. Valves V5 and V6 may be and preferably are of a usual three-element, gas-filled type. They are provided with potentiometer type grid control circuits comprising a common supply transformer T16 and individual transformers T12 and T13. The transformer T16 has a usual center-tapped secondary winding connected, through a condenser C14, to one terminal of the primary windings of transformers T12 and T13. The terminals of the secondary winding of transformer T16 are connected together by a bridge comprising a condenser C10, a resistor $r7$ and additional resistance represented by a pair of reversely connected, high vacuum tubes V7 and V8, which may be of a conventional type. The remaining terminals of the primary windings of transformers T12 and T13 are connected to this bridge at the point 14, which is between resistor $r7$ and the plate circuits of valves V7 and V8. It will be noticed, accordingly, that by varying the effective values of resistance represented by valves V7 and V8, the relation between the reactance and resistance in the above-mentioned bridge circuit is varied and, consequently, the phase relation between the voltage of transformer T16 and the voltages of transformers T12 and T13 is correspondingly varied, it being noted that transformers T12 and T13 are connected to the bridge circuit in opposed relation to each other. The characteristics of the bridge and associated circuits are also such that when the resistance of valves V7 and V8 is at a maximum value, the voltages of transformers T12 and T13 reach values sufficiently high to fire their corresponding heat control valves V5 and V6 as a point late in half cycles of the welding current. Similarly, when the resistance of valves V7 and V8 is at a minimum, the voltages of transformers T12 and T13 reach values sufficient to fire valves V5 and V6 at correspondingly earlier points in half cycles. As will be understood, the firing points of valves V5 and V6 and, consequently, of rectifiers R1 and R2 may thus be varied over relatively wide ranges corresponding, for example, from a full heat value to a value down as low as 15% to 20% of full heat.

The grid-cathode circuit of valve V7 includes in series relation a resistor $r8$, a phase shifting condenser C13, the potential whereof is controlled, as described below, and a resistor $r9$. In addition, a smoothing condenser C11 is preferably directly connected between the grid and cathode of valve V7. The grid and cathode circuit of valve V8 is similarly connected directly across the phase shifting condenser C13, in series with resistors $r10$ and $r11$. Also, a smoothing condenser C12 is preferably connected directly across the grid-cathode circuit of valve V8. Thus, it will be appreciated that the grid-cathode potentials of valves V7 and V8 are at all times determined by the potential of the condenser C13, and that when this potential is at a maximum, valves V7 and V8 are of maximum resistance (affording a minimum heat setting for the system). When this potential is at a minimum, on the other hand, the resistance of valves V7 and V8 is at a minimum (affording a maximum heat setting for the system).

In the illustrated system, further, the potential of condenser C13 is automatically varied, to thereby effect an automatic variation in the heat setting of the system. As shown, this automatic variation takes place during only the initial heating stage and functions to automatically increase the heat setting from a minimum value to a maximum value during such initial stage, thereby affording a preheating effect. The adjustment is preferably such that the automatic rise to the maximum heat setting takes place during the initial heating period of such initial stage, although, if desired, the rate of change of the heat setting may be decreased so that an interval corresponding to the over-all length of two or more heating periods and intervening cooling periods is required to complete the full change from minimum heat setting to maximum heat setting. More particularly, the fall and rise of the potential of condenser C13 is controlled by commutating its connections to a charging circuit comprising potentiometer $r15$ and a regulating resistor $r17$, and a discharging circuit comprising potentiometer $r14$ and regulating resistor $r16$. The commutation of these circuits is controlled by contacts CR11b and CR11c of control relay CR11, it being noted that when contact CR11b is closed, condenser C13 is enabled to charge through a circuit which extends from its positive terminal 40 through conductors 20, 22 and 24, potentiometer $r15$, resistor $r17$, conductor 26, contact CR11b, a normally closed transfer switch 28, and conductor 30 to its negative terminal 42. On the other hand, when relay CR11 is energized, its contact CR11b is open and its contact CR11c completes a discharging circuit for condenser C13, which includes conductors 20, 22 and 24, potentiometer $r14$, resistor $r16$, contact CR11c, conductor 32, switch 28 and conductor 30. It will be noticed, also, that the setting of potentiometer $r15$ determines the maximum voltage to which condenser C13 is charged, and that resistor $r14$ determines the minimum voltage to which condenser C13 is discharged, both of which values are, of course, obviously adjustable. Resistor $r16$, in series with potentiometer $r14$, serves to variably determine the rate at which condenser C13 is discharged from its maximum to its minimum value, and a corresponding control of the charging rate is provided by resistor $r17$.

Potentiometers $r14$ and $r15$ are supplied with voltage from a usual rectifying circuit comprising the continuously energized transformer T20 and a usual full wave rectifier V9. As illustrated, also, this rectifying circuit includes balancing elements comprising the resistor $r13$ and condenser C14.

As described below, relay CR11 is energized at the beginning of the initial heating period of the initial heating stage, and is de-energized at the end of each welding cycle. During such initial heating stage, the welding current, consequently, rises from a minimum to a maximum value. The rate of change of the current value may be adjusted, as aforesaid, so as to cause the maximum value to be attained at a desired point in such heating stage. In general, it is preferred to adjust the minimum value to correspond to approximately 20% of full heat, full heat being defined as usual as being attained by firing the main rectifiers at the power factor angle of the system. Depending upon the current requirements of the welding load, the maximum value of the heat setting may fall anywhere between 50% and 100% of full heat.

As shown, the thermoelectric apparatus which is utilized to respond to the temperature of the work and to, consequently, control the length of each heating and cooling stage comprises a thermocouple, the hot junction whereof is afforded by the junction between a thermocouple element 114, such as the alloy constantan, and the usual copper electrode 12. The element 114 is illustrated as being embedded in the electrode 12, the just-mentioned junction being afforded at the work engaging surface of the electrode 12, it being understood that, except at such junction, element 114 is insulated from the electrode 12. The cold junction of the system is constituted by a multiple adjustment pyrometer 100, which may be and preferably is of conventional construction and which, consequently, is shown in outline form only. The electrode 12 is shown as being permanently connected to the pyrometer input terminal 102, while the element 114' is selectively connectible by means of the arm 112 of the hereinafter described ratcheting unit to any of a plurality of pyrometer input terminals 104, 106, 108 and 110. As will be understood, when the position of arm 112 is such that input terminals 102 and 104 are active, a pyrometer setting is afforded which causes it to respond to one temperature of the work. When the position of arm 112 is such that terminals 102 and 106 are active, the pyrometer responds to a different work temperature, when the position of arm 112 is such that terminals 102 and 108 are active, the third temperature setting is afforded, and when terminals 102 and 110 are active, still another temperature setting is provided. In the present system, three heating stages are provided, terminals 104, 106 and 108 corresponding, respectively, to a welding stage, a grain refining stage, and an annealing stage. The remaining terminal 110 serves to determine the temperature to which the work falls during the successive cooling stages.

The pyrometer 100 is provided with a single contact, designated PYa in Fig. 1, which contact occupies the illustrated open position so long as the thermoelectric potential to which the pyrometer is subjected is below a value corresponding to the existing adjustment of the pyrometer, but which moves to and remains in the closed position so long as such potential is at or above the just-mentioned adjusted value.

The means for operating the arm 112 and the companion arm 126, which, in the illustrated system, controls a forging pressure relay CR8, comprises a ratchet operated drum 58, which is continuously biased to the illustrated position by means of a usual spiral spring 101, and which is also provided with a ratcheting pawl 120 and a resetting pawl 122. The ratcheting and resetting pawls are provided with operating solenoids 54 and 56, respectively, and in addition the ratcheting unit is provided with a limit switch 124. Switch 124 is biased to the closed position by a spring 125, but is moved to and retained in the open position when the ratchet drum reaches the illustrated starting position.

It is thought that the remaining details of the system may best be understood from a description of the operation of the system as a whole.

Assuming it is desired to effect a welding operation, the system may be conditioned for operation by closing the illustrative line switches LS1 and LS2, which connect line conductors L1 and L2, in each of Figs. 1, 2 and 3, to a usual alternating current source of supply. Upon being energized, line conductors L1 and L2 complete obvious energizing circuits in Fig. 1, for the primary windings of transformers T3 and T11, associated, respectively, with valves V1 and V4. These valves, as well as valve V3, may be and preferably are of the usual three-element, high vacuum type and, as will be understood, they may be provided with usual heating circuits which bring the cathodes c thereof to emissive temperatures. These heating connections have been omitted from the drawings to simplify them. Upon being energized, transformers T3 and T11 apply blocking potentials to the grids of the associated valves, and also charge up the associated grid condensers C1 and C6. These actions serve to render the corresponding valves non-conductive, as will be understood.

In Fig. 2, the energization of line conductors L1 and L2 supplies energy to transformer T21, which furnishes filament current to a rectifier, enabling the latter to apply a D. C. potential between terminals 50 and 52, thereby affording a source of direct current for operating the windings 54 and 56, associated with the ratchet unit 58.

In Fig. 3, the energization of line conductors L1 and L2 supplies, through obvious circuits, energizing current for the filament transformers T14 and T15, associated with the filament circuits of valves V5 and V6. As obvious circuit is also completed for transformer T17, which supplies filament current for valves V7, V8 and V9.

The energization of line conductors L1 and L2 (Fig. 3) also energizes transformer T20, which thereupon, through rectifier V9, applies a fixed potential across potentiometers r14 and r15, which action results in charging condenser C13 to its maximum value, the charging circuit extending through resistor r15 and the now closed back contact CR11b of relay CR11. As aforesaid, the potential of condenser C13 negatively biases valves V7 and V8, and being at a maximum value, substantially a maximum resistance is afforded by valves V7 and V8.

The energization of line conductors L1 and L2 (Fig. 3) also energizes transformer T16, which, through the previously described bridge circuit, energizes grid transformers T12 and T13, associated with valves V5 and V6. These potentials, which are at a phase position corresponding to approximately a minimum heat setting of the system, tend, during successive half cycles, to fire valves V5 and V6. Under the conditions stated, however, the plate circuits of these valves are interrupted at the now open contacts CR12a and CR12b of relay CR12, so that no current is passed by these valves.

Assuming it is desired to effect a welding operation, the workpieces W may be introduced between the electrodes 10 and 12, after which the pilot switch P1 may be closed. Pilot switch P1 serves to afford a complete welding cycle having the aforesaid welding, refining and annealing stages, and closure of this switch completes an obvious energizing circuit for a usual solenoid operated fluid-control valve 60, which action may, in any desired manner, serve to cause the electrodes to move into clamping engagement with the work at a pressure suitable for welding.

Closure of pilot switch P1, also, through conductor 68, directly energizes transformers T1 and T2, associated with valve V1. Upon being energized, transformer T2 opposes the previously energized blocking transformer T3 and enables the energy stored in condenser C1 to discharge through the associated resistor $r1$. At the expiration of a discharge period, proportioned to be long enough to enable the full movement of the electrodes into the clamping position, valve V1 becomes conductive, enabling the now energized plate transformer T1 to pass current therethrough and energize control relay CR2. Upon being energized, relay CR2 closes its contacts CR2a and CR2b. Closure of contact CR2b (Fig. 2) prepares a circuit for control relay CR7, which action is without immediate effect. Closure of contact CR2a prepares a circuit for transformer T7, which circuit remains incomplete, however, pending closure of the companion pilot switch P4.

Assuming it is desired to initiate the weld, pilot switch P4 may be closed, which action directly completes a circuit for relay CR1, subject only to the now closed back contact CR7a of relay CR7. Upon being energized, relay CR1 closes its contacts CR1a, CR1b and CR1c. Contact CR1b directly completes a holding circuit for relay CR1, in parallel with switch P4, which may thereupon be released to the open position without affecting the cycle now in progress; and in conjunction with contact CR1a, completes a holding circuit for valve 60. Completion of the latter holding circuit enables switch P1 to be released without effect.

The closure of switch P4 also completes a circuit (which is held closed after the opening of switch P4 by contact CR1b) for transformer T7, associated with valve V3. Upon being energized, transformer T7 applies anode potential to the normally conductive valve V3 and passes current therethrough to energize control relay CR4. Upon being energized, relay CR4 closes its contacts CR4a and CR4b, which contacts are connected in series relation with each other. Closure of contact CR4a completes a circuit through conductor 82 for the coil of relay CR11, which circuit also includes the now closed back contact CR7a of relay CR7, which thereupon closes its contacts CR11a and CR11c, and opens its contact CR11b. The effect of contacts CR11b and CR11c is described below, but closure of contact CR11a completes a self-holding circuit for relay CR11, which holding circuit, however, includes the now closed contact CR1b of relay CR1.

Closure of contact CR4a in conjunction with contact CR4b energizes the firing relay CR12, through a circuit which includes, in series relation, the now closed back contacts CR5a and CR7a of relays CR5 and CR7. Upon being energized, relay CR12 closes its contacts CR12a and CR12b. Closure of contacts CR12a and CR12b (top of Fig. 3) applies anode potential to the firing valves V5 and V6. The circuit for valve V5 extends from line conductor L1 through conductor 90 (bottom of Fig. 2 and top of Fig. 3), contacts CR12a, valve V5, conductor 92 (bottom of Fig. 2 and top of Fig. 3), igniter $i$ and cathode $c$ of main rectifier R1, and thence through conductor 94 and the primary of the welding transformer WT to line conductor L2. Closure of contact CR12b completes a similar circuit through which potential is applied across valve V6 and it will be noted that in these circuits, valves V5 and V6 are connected, respectively, in parallel with the anode-igniter circuits of main rectifiers R1 and R2.

It will be recalled from previous description that, during each successive positive half cycle and, with the initial adjustment of the system, at a point therein which corresponds to about 20% full heat, transformer T12 applies a conductive potential to the grid of valve V5, tending to render this valve conductive. At a corresponding point in each negative half cycle, a conductive potential is applied to the grid of valve V6 by transformer T13. Depending upon whether the closure of contacts CR12a and CR12b takes place during a positive or a negative half cycle, therefore, either main rectifier R1 or main rectifier R2 is the first main rectifier to be fired. Assuming such closure occurred during a positive half cycle, the potential applied to valve V5 passes current therethrough and passes an igniting current between the igniter $i$ and the cathode $c$ of rectifier R1, which action, as will be understood, fires this valve and initiates the flow of welding current. At the corresponding point in the succeeding negative half cycle, rectifier R2 is fired through valve V6 and so long, therefore, as contacts CR12a and CR12b remain closed, rectifiers R1 and R2 are effective to pass current to the welding circuit at a heat setting determined by the phase shift adjustment of transformers T12 and T13.

Upon being energized, as aforesaid, and simultaneously with the energization of relay CR12, relay CR11 opens its back contact CR11b and closes its front contact CR11c. The former action interrupts the circuit for condenser C13, which includes the minimum heat setting potentiometer $r15$. On the other hand, closure of contact CR11b completes the previously described discharge circuit for condenser C13, which circuit includes potentiometers $r14$ and $r16$ and through which circuit condenser C13 is enabled to gradually discharge to the minimum potential determined by potentiometer $r14$, at a rate determined by resistor $r16$. In response to this action, the potential across condenser C13 gradually falls from its normal or maximum value towards its minimum value. The progressive decrease in potential across condenser C13 is reflected as a decrease in the negative grid bias potential of valves V7 and V8, which action correspondingly and gradually decreases the resistance of these valves and alters the ratio of reactance to resistance in the bridge circuit to which transformers T12 and T13 are connected. As aforesaid, this shift gradually advances the points in successive positive and negative half cycles at which valves V5 and V6 are rendered conductive. This, in turn, advances the point in such half cycles at which rectifiers R1 and R2 are fired, and correspondingly increases the value of the welding current.

In addition to the operations described above, closure of contacts CR4a and CR4b of relay CR4 completes an energizing circuit for the grid transformer T8 associated with valve V3, which action blocks this valve and interrupts the supply of current to relay CR4 from anode transformer T7. In response to this action, the energy stored in the coil of relay CR4 starts to discharge through the associated condenser C4 and at the expiration of a predetermined heating period, relay CR4 resumes the de-energized position, opening its contacts CR4a and CR4b. In view of the holding circuit afforded by contact CR11a, this action is without effect on the phase shift control relay CR11, which, consequently, continues to maintain the circuit connections corresponding to a minimum potential of condenser C13. The opening of contacts CR4a and CR4b does, however, de-energize relay CR12, which thereupon reopens its contacts CR12a and CR12b. The opening of these contacts interrupts the anode circuits of the firing valves V5 and V6, which thereupon become ineffective to apply firing potentials to the main rectifiers R1 and R2. In view of the known character of the latter rectifiers, the interruption of these anode circuits has no effect on a flow of current then in progress through one or the other of the rectifiers R1 and R2. Such action does, however, cause the flow of welding current to be terminated at the end of the half cycle then in progress, and prevents a re-initiation of the flow of welding current during a succeeding half cycle.

The opening of contacts CR4a and CR4b also de-energizes grid transformer T8, enabling the energy now stored in condenser C5 to start discharging through the local circuit, including resistor r3. At the expiration of a predetermined discharge period, valve V3 again becomes conductive, enabling transformer T7 to re-energize relay CR4. This action duplicates the action which resulted from the initial energization of relay CR4 in so far as concerns the re-energization of the firing relay CR12, and the consequent re-initiation of the flow of welding current, except that in this instance the re-initiated welding current is of a value corresponding to the now existing potential of condenser C13. As aforesaid, in many cases, it is preferred to adjust the system so that the charging rate of condenser C13 is such that the maximum heat setting is attained during the initial heating period, in which event, the just-mentioned second heating period is initiated at a full heat setting. The re-energization of relay CR4 also re-energizes transformer T8 and applies a blocking potential to the grid of valve V3. This action again initiates a timing out of relay CR4, at the expiration of which it resumes the de-energized position, as before. So long, therefore, as transformer T7 remains energized, relay CR4 pulsates between an energized position and a de-energized position, the energized interval being determined by condenser C4 and the de-energized interval being determined by condenser C5. Each energized interval, in turn, affords a heating period during which current flows to the welding circuit, and each de-energized interval affords a cooling period during which such current flow is prevented.

As thus far described, accordingly, closure of the pilot switches P1 and P4 has brought the electrodes into engagement with the work with a welding pressure, and has initiated a flow of welding current to the work, which flow of welding current takes place as a succession of separated heating periods, each heating period comprising a desired fraction of each of a plurality of half cycles of the source. This flow of welding current continues until interrupted by the temperature responsive elements which, in conjunction with the ratcheting device 58, serve to determine the number of stages, temperatures attained in the successive stages and the temperatures attained in the intervals between successive stages.

Continuing now with the description of the operation, the initial energization of relay CR1, which results from the closure of pilot switch P4 at the beginning of the welding cycle, also causes this relay to close its front contact CR1c. This action completes a circuit through the now closed series connected back contacts CR6b and CR5c for the winding 54, associated with the advancing pawl of the ratchet unit. This circuit serves to apply the rectified potential between terminals 50 and 52 to winding 54, through conductors 130, 132, a portion of line conductor L1 and the above-mentioned contacts. Upon being energized, winding 54 advances pawl 120 and moves the ratchet unit to its first operating position, in which arms 112 and 126 engage terminals b1 and a1, respectively. The latter engagement is without effect, but the former engagement connects input terminals 102 and 104 to the thermocouple afforded by the electrode 12 and the embedded element 114. The flow of welding current initiated as described above, causes the temperature of the work to progressively rise, which rise in temperature, taking place during the course of successive heating periods of the initial heating stage, is reflected as an increasing thermo-electric E. M. F. between terminals 102 and 104. When this temperature reaches a welding value, appropriate to the formation of a weld nugget between the workpieces, pyrometer 100 responds and immediately closes its contact PYa. Referring to Fig. 1, this action immediately energizes relay CR6 and transformers T9 and T10, associated with valve V4. Upon being energized, relay CR6 opens its contact CR6b and closes its contact CR6a. The opening of contact CR6b interrupts the previously traced energizing circuit for solenoid 54, enabling the spring associated with pawl 120 to withdraw it to a position in which it engages behind the next successive tooth of the ratchet drum, this action being preparatory to an advancing movement of the ratchet unit.

Upon being energized, transformer T10 opposes the continuously energized transformer T11 and enables the energy stored in condenser C6 to discharge through the local circuit comprising resistor r4. At the expiration of a short interval, of the order of a cycle or two, sufficient only to allow the above-mentioned withdrawal of the pawl 120, valve V4 becomes conductive. This action enables transformer T9 to pass current therethrough and energize relay CR5, which thereupon opens its contacts CR5a and CR5c and closes its contact CR5b. The opening of contact CR5c is without immediate effect, since contact CR6b is now open, but the closure of contact CR5b completes a circuit, through contacts CR1c and CR6a, for winding 54, which thereupon actuates pawl 120 and advances the ratchet unit to its second position in which arm 112 engages terminal b2 and arm 126 engages terminal a2.

The latter action completes a circuit for relay CR8, which thereupon closes its sole contact CR8a (near the top of Fig. 2). This action energizes a usual forging pressure valve 152, resulting, in any suitable way, in the application to the work of a substantially higher or forging pressure.

The transfer movement of arm 112 interrupts the pyrometer input circuit between terminals 102 and 104 and completes an input circuit between terminals 102 and 110. This transfer movement is quite rapid and, due to the sluggish character of the pyrometer 100, is completed before contact PYa has an opportunity to open. As soon as the transfer movement is completed, the pyrometer is readjusted to a materially lower temperature, (preferably, to a temperature well below the annealing temperature of the work) and, consequently, maintains its contact PYa closed until such materially lower temperature is attained.

The opening of contact CR5a immediately interrupts the energizing circuits for transformer T7 and for firing relay CR12. It will be noted that this action may take place either during a heating period or during a cooling period, since it is found in practice that the temperature of the work may continue to build up at least throughout the initial portion of a cooling period. Consequently, the critical operating temperature, at which the pyrometer responds, may be attained during a cooling period. If the pyrometer responds, during a cooling period, the opening of contact CR5a is without immediate effect, since under these conditions, relays CR4 and CR12 are already de-energized. In such instance, the opening of contact CR5a serves only to prevent the re-energization of relays CR4 and CR12 and, consequently, prevents the initiation of a heating period at the conclusion of the cooling period then in progress.

On the other hand, if the pyrometer responds during a heating period, the consequent opening of contact CR5a immediately de-energizes relay CR12 and thereby interrupts the flow of welding current, terminating the first heating stage, and initiating the first cooling stage. In such case, also, the deenergization of transformer T7 is without immediate effect on relay CR4 because of the holding action of condenser C4, but does prevent the re-energization of relay CR4.

When the temperature of the work has fallen to the aforesaid low value, preferably well below the annealing temperature of the work, the pyrometer contact PYa resumes its open position, which action immediately de-energizes relay CR6, transformer T9 and transformer T10. The de-energization of relay CR6 causes its contacts CR6a and CR6b to resume the illustrated positions. Reclosure of contact CR6b prepares the original energizing circuit for ratchet winding 54, and the opening of contact CR6a interrupts the last traced circuit for winding 54. In response to this action, pawl 120 is withdrawn to a position in which it engages behind the next ratchet tooth, preparatory to the next ratcheting step.

The de-energization of transformer T10 enables the continuously energized transformer T11 to apply a blocking potential to the grid of valve V4, which action interrupts the original energizing circuit for relay CR5 and enables the energy stored in the coil thereof to discharge through the local circuit comprising condenser C6'. At the expiration of a short period, sufficient only to allow the above resetting movement of the ratchet pawl 120, relay CR5 resumes the de-energized position, restoring its contacts CR5a, CR5b and CR5c to the illustrated positions. The transfer action of contacts CR5b and CR5c recompletes the original energizing circuit for winding 54, which thereupon acts to advance the ratchet drum to the third operating position in which arms 112 and 126 engage terminals b3 and a3, respectively.

When arm 126 moves away from terminal a2, it interrupts the circuit for relay CR8, which thereupon resumes the deenergized position. This action de-energizes the forging pressure valve 152, restoring the electrode pressures to the lower or welding value. In the sequence now being described, the engagement of terminal a3 by arm 126 is without effect.

The engagement of arm 112 with terminal b3 connects terminals 102 and 106 to the thermocouple, which terminals, as aforesaid, adjust the pyrometer to a temperature appropriate to a grain refining heat. This adjustment makes no change in the now open position of the pyrometer contact PYa, since this grain refining temperature is well above the pre-existing temperature of the work.

The reclosure of contact CR5a completes the original energizing circuit for transformer T7, associated with valve V3. Upon completion of this circuit, relay CR4 is again energized and initiates the second heating stage in the manner described with reference to the first stage, with the exception that in this instance the energized relay CR11 has already caused the phase shift condenser C13 to establish the maximum heat setting for the system. It is believed that it will be evident that during this second stage, relay CR12 is again pulsated between energized and de-energized conditions, so as to provide successive heating and cooling periods in the same manner that these periods are provided during the initial or welding stage. Also, when the work attains the grain refining temperature, the pyrometer responds, as before, to initiate the second cooling stage. In this case, the initiation of the second cooling stage involves advancing the ratchet arms into engagement with terminals b4 and a4, respectively. The latter action again energizes the forging pressure relay CR8, which acts to apply the forging pressure to the work. The engagement of terminal b4 again adjusts the pyrometer for its minimum temperature corresponding to the temperature attained at the expiration of the first cooling stage.

At the expiration of the second cooling stage, also, the third heating stage is initiated in the same manner that the second stage was initiated, except that in this case, the ratchet arms advance into engagement with terminals b5 and a5, respectively, it being understood that terminal b5 adjusts the pyrometer for the third or annealing stage.

During the course of the third heating stage, relay CR12 is again pulsated in the previously described manner, it being noted, of course, that the second stage may be expected to include fewer heating and cooling periods than the first stage, and that the third stage may be expected to include fewer such periods than the second stage.

The third cooling stage also proceeds in the previously described manner and at the conclusion thereof the system is reset to its original condition as follows.

When the minimum temperature corresponding to the pyrometer input terminal 110 is reached, the pyrometer contact PYa again opens and, as before, by virtue of the reclosing of contacts CR6b and CR5b, the ratcheting unit is advanced to its seventh position, in which the arms 126 and 112 engage terminals a7 and b7. The terminal b7 is an inactive terminal in the operation now being described.

The movement of arm 126 out of engagement with terminal a6 again de-energizes the forging pressure relay CR8, restoring the electrode pressure to the normal or welding value. Its movement into engagement with terminal a7 completes the circuit, subject to the now closed contact CR2a for the resetting relay CR7. In response to this action, relay CR7 assumes the energized position, closing its contacts CR7b and CR7c and opening its contact CR7a. The opening of contact CR7a immediately interrupts the circuits for relays CR1, CR11 and CR12, and also interrupts the circuits for anode transformers T1 and T7, associated, respectively, with valves V1 and V3. The interruption of the circuit for relay CR12, at contact CR7a, prevents the re-energization of this relay, which re-energization normally occurs at the expiration of a cooling stage, and thus terminates the welding cycle. The interruption of the circuit for relay CR11 causes this relay to resume the illustrated position. This action, at contacts CR11c and CR11b, interrupts the discharging circuit for the phase shifting condenser C13 and recompletes the original charging circuit therefor, preparatory to the next welding operation. Closure of contact CR7b completes a circuit for the resetting winding 56, associated with the ratchet unit, which thereupon withdraws the pawl 122 from engagement with the ratchet drum, preparatory to the return movement of the drum.

It is to be noted that the de-energization of relay CR5, which resulted from the opening of contact PYa at the conclusion of the final cool period, not only energizes relay CR7, as aforesaid, but, at contact CR5a, tends also to recomplete the circuit for transformer T7, thereby tending, through the consequent sequential energization of relays CR4, CR11 and CR12, to re-initiate the flow of welding current. Such recompletion may be prevented by providing a slight delay in the closing movement of contact CR5a, sufficient to enable the opening of contact CR7a, to precede such closure. Even in the absence of such time delay on contact CR5a, the recompletion of the circuit for transformer T7 is of a momentary character only. In practice it is found that by virtue of its relatively heavier character, the firing relay CR12 does not have time to reach the closed position before its circuit is opened by the opening of contact CR7a. If desired, suitable means may be provided to delay the closure of contactor CR12.

Continuing with the resetting action, the de-energization of relay CR1 causes its contacts CR1a, CR1b and CR1c to re-open. The latter contact de-energizes operating winding 54 of the ratchet unit, and enables the associated return spring to restore it to the illustrated starting position, in which the arms 126 and 112 are out of engagement with their associated commutator terminals. At the conclusion of this return movement, the cam 123 on the ratchet drum opens the limit switch 124, thereby de-energizing the reset winding 56.

The return sweep of the arm 112 sequentially reconnects the terminals 110, 108, 106 and 104, which action is, however, without effect, since the work is now below the temperatures to which these terminals correspond. The return sweep of the arm 126 causes it to momentarily complete circuits for the forging pressure relay CR8, but this return movement is so rapid that the relay does not remain energized long enough to have any effect. The return sweep of the arm 126 also interrupts the initially traced circuit for relay CR7, which action is, however, without effect in view of the holding effect of the now closed contact CR7c, which is connected in parallel with arm 126.

Contacts CR1a and CR1b, in opening, further interrupt the circuit for transformer T1 and also interrupt the previously traced holding circuits in parallel with the pilot switches P1 and P4. In addition, the opening of contacts CR1a and CR1b interrupts the circuit for the welding pressure valve 60, which thereupon relieves the welding pressure from the work and enables the work to be removed from or adjusted in the machine, preparatory to the making of the next weld.

The de-energization of transformer T1 de-energizes control relay CR2, which thereupon resumes the de-energized position, opening its contacts CR2a and CR2b. The re-opening of contact CR2a is without effect, in view of the previous opening of contact CR1a, but the re-opening of contact CR2b interrupts the previously traced holding circuit for the resetting relay CR7, which thereupon resumes the illustrated position without effect. The above-described resetting operations serve to restore the system to its normal condition, in readiness for the next welding operation.

A welding operation comprising only two heating and two cooling stages may be effected by closing pilot switch P2. The resulting operations are the same with the exception that such closure directly energizes relay CR9 (top of Fig. 1). Relay CR9, in turn, through its contact CR9a, energizes valve 60 and performs the other operations previously attributed to switch P1. Upon being energized, relay CR9 also closes its contact CR9b, which serves, as shown in Fig. 2, to connect the coil of relay CR7 to the commutator terminal a5. It will be recalled that the arm 126 moves into engagement with this terminal immediately following the conclusion of the second cooling stage. Since, also, the energization of relay CR7 terminates the welding operation, as described above, it will be appreciated that by energizing this relay, following the second cooling stage, the cycle may be limited, as aforesaid. Also, a single stage operation can be effected by closing pilot switch P3, which action, in addition to the other described operations, energizes relay CR10. If relay CR10 is energized, its contact CR10b connects the coil of relay CR7 to the commutator terminal a3. It will be recalled that this terminal is engaged at the conclusion of the first cooling stage.

Although only a single embodiment of the invention has been described in detail, it will be appreciated that various changes may be made therein within the spirit and scope of the invention.

What is claimed is:

1. In a control system for controlling flow of current between a work circuit and a source of periodic current, electric valve means for controlling said flow, control means for actuating said valve means to enable said flow during a succession of periods of said source, means for causing the portions of the said periods throughout which said flow occurs to vary in accordance with a predetermined pattern, said varying means including an energy storage device, means including circuit connections for providing control circuits through which said device may respectively be charged and discharged, said portions being progressively increased when one of said control circuits is effective and being progressively decreased when the other of said control circuits is effective, and means for commutating said connections.

2. In a control system for controlling flow of current between a work circuit and a source of periodic current, electric valve means for controlling said flow, control means for actuating said valve means to enable said flow during a succession of periods of said source, means for causing the portions of the said periods throughout which said flow occurs to vary in accordance with a predetermined pattern, said varying means including an energy storage device, means including circuit connections for providing control circuits through which said device may respectively be charged and discharged, said portions being progressively increased when one of said control circuits is effective and being progressively decreased when the other of said control circuits is effective, and means for commutating said connections, one of said commutating and control means being operably responsive to the other.

3. In a control system for controllnig flow of current between a work circuit and a source of periodic current, electric valve means for controlling said flow, control means for actuating said valve means to enable said flow during a succession of periods of said source, means for causing the portions of the said periods throughout which said flow occurs to vary in accordance with a predetermined pattern, said varying means including an energy storage device, means including circuit connections for providing control circuits through which said device may respectively be charged and discharged, said portions being progressively increased when one of said control circuits is effective and being progressively decreased when the other of said control circuits is effective, and means for commutating said connections, said varying and commutating means operating in timed relation to each other.

4. In a control system for controlling flow of current between a work circuit and a source of periodic current, electric valve means for controlling said flow, control means for actuating said valve means to enable said flow during a succession of periods of said source, means for causing the portions of the said periods throughout which said flow occurs to vary in accordance with a predetermined pattern, said varying means including an energy storage device, means including circuit connections for providing control circuits through which said device may respectively be charged and discharged, said portions being progressively increased when one of said control circuits is effective and being progressively decreased when the other of said control circuits is effective, and means for commutating said connections, said commutating means being operably responsive to said control means.

5. In a system for controlling flow of current between a source of power and a work circuit, the combination of means enabling said flow during each of a succession of intervals, each interval being of controllable length, means individual to each interval for controlling the duration thereof, indexing means for selecting said individual means, and means operated as a consequence of the initiation of current flow in one said interval for actuating the indexing means and controlling the initiation of current flow during a succeeding interval.

6. In a system for controlling flow of current between a source of power and a work circuit, the combination of means enabling said flow during each of a succession of intervals, each interval being of controllable length, means individual to each interval for controlling the duration thereof, indexing means for selecting said individual means, control means actuable to initiate flow of current during an initial said interval, and means operated as a consequence of the actuation of said control means for adjusting said indexing means to correspond to the next said interval.

7. In a system for controlling flow of current between a source of power and a work circuit, the combination of means enabling said flow during each of a succession of intervals, each interval being of controllable length, means individual to each interval for controlling the duration thereof, indexing means for selecting said individual means, control means actuable to initiate flow of current during an initial said period, and means operated as a consequence of the actuation of said control means for adjusting said indexing means to correspond to the next said interval, said adjustment being made at the conclusion of said one interval.

8. In a system for controlling flow of current between a source of power and a work circuit, the combination of means enabling said flow during each of a succession of intervals, each interval being of controllable length, means individual to each interval for controlling the duration thereof, indexing means for selecting said individual means, and means operated as a consequence of the initiation of current flow in one said interval for actuating the indexing means and controlling the initiation of current flow during a succeeding interval, said indexing means comprising means operated in accordance with a physical characteristic of the work circuit which varies as a consequence of the flow of current therethrough.

9. In a system for controlling flow of current between a source of power and a work circuit, the combination of means enabling said flow during each of a succession of intervals, each interval being of controllable length, means individual to each interval for controlling the duration thereof, indexing means for selecting said individual means, and means operated as a consequence of the initiation of current flow in one said interval for actuating the indexing means and controlling the initiation of current flow during a succeeding interval, said indexing means comprising thermally responsive means actuated in response to a change in temperature produced by flow of current through the work circuit.

CLETUS J. COLLOM.
GUSTAV E. UNDY.